United States Patent Office 3,450,729
Patented June 17, 1969

3,450,729
PROCESS FOR THE PREPARATION OF GALLIUM LACTATE
Thomas H. Larkins, Jr., and Michael O. Malcolm, Kingsport, Tenn., assignors to Eastman Kodak Company, Rochester, N.Y., a corporation of New Jersey
No Drawing. Filed Nov. 3, 1967, Ser. No. 680,304
Int. Cl. C07f 5/00
U.S. Cl. 260—429                 15 Claims

ABSTRACT OF THE DISCLOSURE

Gallium lactate may be prepared by forming a water-insoluble gallium compound, washing said compound to substantially remove halogen therefrom, and adding said substantially halogen-free compound to an aqueous solution of lactic acid to form gallium lactate.

---

This invention relates to gallium lactate useful as a polymerization catalyst in the preparation of polyesters. In one of its more specific aspects, this invention relates to a new process for the preparation of gallium lactate.

Processes for the preparation of gallium lactate are disclosed in P. Neogi and S. K. Naudi, "Journal of the Indian Chemical Society," vol. 13, pp. 399–403 (1936) and H. C. Dudley and R. N. Garzoli, "Journal of the American Chemical Society," vol. 70, pp. 3942–3943 (1948). Both publications disclose the conversion of gallium metal to an aqueous solution of gallium chloride and/or gallium trinitrate, followed by neutralization with base to produce hydrous gallium oxide, which is $Ga_2O_3 \cdot 2H_2O$. The hydrous gallium oxide is then reacted with lactic acid to produce an aqueous solution of gallium lactate, $Ga(O_2CCHOHCH_3)_3$, which may then be recovered by crystallization. However, this preparation involves two factors which are undesirable from the commercial viewpoint. First, the hydrous gallium oxide tends to readily and spontaneously form chemically inert $Ga_2O_3 \cdot 1.5H_2O$. Second, hydrous gallium oxide is a gelatinous material which is very difficult to wash free of impurities (such as entrained chloride ions). Hence, the washing operation is difficult and time-consuming, and these operations would be costly to perform on a commercial scale. As a result, a new process for the preparation of gallium lactate is needed which would substantially avoid the above-mentioned disadvantages.

It is an object of this invention to provide a new and useful process for the preparation of gallium lactate.

Another object of this invention is to prepare gallium lactate by a process which avoids the formation of significant quantities of hydrous gallium oxide.

Still another object of this invention is to prepare gallium lactate useful as a polymerization catalyst in the preparation of polyesters.

Other objects of this invention will appear herein.

These and other objects are attained through the practice of this invention, one embodiment of which comprises providing a process for preparing gallium lactate, said process comprising:

(A) Forming a water-insoluble gallium compound by mixing (1) a material selected from the group consisting of aqueous solutions of gallium trichloride-trinitrate and aqueous solutions of sodium gallate, (2) an organic material selected from the group consisting of carboxylic acids, diketones, and hydroxyketones, and (3) a material selected from the group consisting of aqueous basic solutions and aqueous acidic solutions to adjust the pH of the mixture to obtain precipitation of the insoluble gallium compound;

(B) Washing the insoluble gallium compound with water to substantially remove halogen therefrom; and (C) Adding the substantially halogen-free insoluble gallium compound to an aqueous solution of lactic acid to form gallium lactate.

The above-referred to aqueous basic solution can be any common base (examples of which are ammonium, sodium, potassium, calcium, magnesium, and lithium hydroxide) or basic salt capable of suitably adjusting the pH to a desired value.

The above-referred to aqueous acidic solution can be any common acid (examples of which are acetic, hydrochloric, nitric, sulfuric, phosphoric, terephthalic, and benzoic acids) or acidic salt capable of suitably adjusting the pH to a desired value.

A wide variety of water-insoluble compounds of gallium are known and are applicable in the process of this invention for preparing gallium lactate. The preferred water-insoluble gallium compound used to prepare the gallium lactate is a water-insoluble gallium salt of a carboxylic acid, a diketone, or a hydroxyketone.

The carboxylic acids which may be used to prepare the water-insoluble gallium compound may be an aliphatic, alicyclic, or aromatic monocarboxylic or dicarboxylic acid, including derivatives thereof. Examples of these acids would include butyric; hexanoic; oxalic; malonic; dimethylmalonic; succinic; methylsuccinic; glutaric; adipic; methyladipic; pimelic; azelaic; sebacic; 1,2-cyclohexanedicarboxylic; 1,3 - cyclohexanedicarboxylic; 1,4-cyclohexanedicarboxylic; 2,5-norbornanedicarboxylic; benzoic; chlorobenzoic; toluic; chlorotoluic; naphthalic; phthalic; isophthalic; 3-chloroisophthalic; terephthalic; 1,4-naphthalic; t-butyl-isophthalic; diphenic; 4,4'-sulfonyldibenzoic; 4,4'-oxydibenzoic; and 2,5-naphthalenedicarboxylic acids.

Various diketones may be used to prepare the water-insoluble gallium compound. The preferred diketones are 2,4-pentanedione; 1,3-hexanedione; and 3,5-nonanedione.

In addition to the carboxylic acids and diketones listed above, many hydroxyketones may be used in preparing the water-insoluble gallium compound. The preferred hydroxyketones are 3-hydroxy-2-butanone and o-hydroxyacetophenone.

If a proper choice of insolubilizing compound is made, essentially quantitative reactions are possible. This is extremely important when working with a costly metal such as gallium.

Gallium metal is available in various degrees of purity. For instance, gallium metal present in waste liquor from the Bayer alumina process is contaminated with mercury. The contaminated gallium may be recovered by electrolysis onto a mercury cathode. Further processing gives a product of 99.9 percent purity containing 40–50 p.p.m. of mercury. An expensive high temperature vacuum process yields gallium having less than one p.p.m. of mercury. In the present invention, it has quite unexpectedly been found that gallium containing 40–50 p.p.m. of mercury yields gallium lactate with no detectable trace of mercury. It appears that mercury is removed in the practice of this invention, thereby rendering this process even more advantageous.

Gallium lactate is normally a slightly hygroscopic, amorphous, white powder having a molecular weight of about 336.85. The pH of 25 milligrams of gallium lactate per one milliliter of water is 2.7. At 20° C., gallium lactate has the following solubility characteristics (stated in grams of gallium lactate per 100 ml. of solvent): water, 8.9 grams; 95 percent ethyl alcohol, 1.5 grams; anhydrous ether, 0.015 gram; and anhydrous acetone, 0.004 gram.

While the literature suggests that gallium acetylacetonate is water soluble, we have found such solubility to be very limited; and thus, the reference herein to it as a water insoluble compound. At temperatures below about 50° C., it is only very slightly soluble, particularly in an ammonium chloride-ammonium nitrate solution.

The gallium lactate produced by the process of this invention is particularly useful as a catalyst for the buildup of polyesters, such as poly(ethylene terephthalate) and poly(1,4-cyclohexylenedimethylene terephthalate). It has been found that a stable catalyst solution for polyester buildup is provided by dissolving 0.1 percent to about 2.0 percent of gallium lactate in ethylene glycol. Preferably 0.01 percent to 0.3 percent of free lactic acid is present, to provide a still more stable composition. This subject matter is described in Kibler and Larkins U.S. Serial No. 680,305, filed Nov. 3, 1967.

This invention will be further illustrated by the following examples of preferred embodiments, although it will be understood that these examples are included merely for purposes of illustration and are not intended to limit the scope of the invention.

Example 1

To 100 grams of gallium metal is added 500 ml. concentrated hydrochloric acid. As the mixture is heated at gentle reflux, 100 ml. concentrated nitric acid is slowly added over a period of one hour. The gallium trichloride-trinitrate solution is diluted with water (without cooling) to 2,000 ml. and 475 grams ( a 10 percent excess) of 2,4-pentanedione is added. The pH is adjusted at 6.8 using ammonium hydroxide and is maintained at this value with stirring but no external heating for 90 minutes. The mixture is filtered, and the product is washed carefully with two 3,000 ml. portions of water. The precipitate is dissolved at 40-50° C. in a solution consisting of 500 grams (5 percent excess) of an 85 percent solution of lactic acid in water, to which approximately 2,000 ml. water has been added. The solution is filtered and evaporated to crystallize gallium lactate. Any excess lactic acid is removed by washing the product with acetone. The product, upon drying, is gallium lactate,

The yield is in excess of 95 percent based on gallium metal used.

Example 2

In a similar manner to that taught in Example 1, 575 grams benzoic acid is added to the gallium trichloride-trinitrate solution containing 100 grams gallium metal and the pH adjusted to 6.4. The precipitate is collected and washed as before and added to 500 grams 85 percent lactic acid solution in 2,000 ml. water. After heating for one hour at 80° C., the liberated benzoic acid is removed by filtration and the gallium lactate collected by crystallization.

Example 3

In a manner similar to that taught in Example 1, 415 grams 3-hydroxy-2-butanone is added and the pH adjusted to 5.5-6.0. The gallium lactate is worked up as in Example 1.

Example 4

In a manner similar to that taught in Example 1, terephthalic acid is substituted for 2,4-pentanedione. Terephthalic acid (390 grams) is dissolved in a minimum quantity of water to which sufficient concentrated ammonium hydroxide solution is added to provide 160 grams of NH₄OH and to the resulting solution is added the gallium trichloride-trinitrate solution containing 100 grams gallium metal. The pH is adjusted to 4.5 and the gallium lactate worked up as in Example 2.

Example 5

Gallium oxide may be used as the gallium source instead of gallium metal as taught in Examples 1–4. To 154 grams gallia hydrate (65.3 percent gallium, equivalent to 100 grams gallium metal) and 176 grams sodium hydroxide is added 700 ml. water. After about one hour at 80° C., the solution of the resulting sodium gallate is filtered. This sodium gallate solution can be used in Example 1 in place of the gallium trichloride-trinitrate solution. The pH is adjusted using hydrochloric acid instead of ammonium hydroxide. Otherwise, the gallium lactate is prepared as taught in Example 1.

Example 6

The ability of gallium lactate to serve as a catalyst for the preparation of poly(ethylene terephthalate) is illustrated by the following example.

A mixture of 77.6 grams (0.4 mole) of dimethyl terephthalate, 49.6 grams (0.8 mole) of ethylene glycol, and 65 p.p.m. zinc from zinc acetate dihydrate are charged into a 500 ml. flask. The flask is swept by nitrogen and immersed in molten metal heated at 195°–200° C. After heating with stirring for one hour, the theoretical amount of methanol is collected and the temperature is raised to 275° C. At this point, 15 p.p.m. gallium, from gallium lactate, dissolved in ethylene glycol is added. The pressure over the colorless melt is lowered to less than 0.2 mm. of mercury and polymerization is continued for one hour. The final product is a water-white, clear melt which crystallizes to a white solid on cooling. It has an inherent viscosity of 0.69 (measured at 25° C. using 0.25 gram of polymer per 100 ml. of a solvent composed of 60 percent phenol and 40 percent tetrachloroethane).

The invention has been described in detail with particular reference to preferred embodiments thereof, but it will be understood that variations and modifications can be effected within the spirit and scope of the invention as described hereinabove and as defined in the appended claims.

We claim:
1. A process for preparing gallium lactate, said process comprising:
(A) forming a water-insoluble gallium compound by mixing (1) a material selected from the group consisting of aqueous solutions of gallium trichloride-trinitrate and aqueous solutions of sodium gallate, (2) an organic material selected from the group consisting of carboxylic acids, diketones, and hydroxyketones, and (3) a material selected from the group consisting of aqueous basic solutions and aqueous acidic solutions to adjust the pH of the mixture to obtain precipitation of the insoluble gallium compound;
(B) washing the insoluble gallium compound with water to substantially remove halogen therefrom; and
(C) adding the substantially halogen-free insoluble gallium compound to an aqueous solution of lactic acid to form gallium lactate.

2. A process as defined by claim 1 wherein said organic material is 2,4-pentanedione.

3. A process as defined by claim 1 wherein said organic material is benzoic acid.

4. A process as defined by claim 1 wherein said organic material is terephthalic acid.

5. A process as defined by claim 1 wherein said organic material is 3-hydroxy-2-butanone.

6. A process for preparing gallium lactate, said process comprising:
(A) forming a water-insoluble gallium compound by mixing (1) an aqueous solution of gallium trichloride-trinitrate, (2) an organic material selected from the group consisting of carboxylic acids, diketones, and hydroxyketones, and (3) an aqueous basic solution to adjust the pH of the mixture to obtain precipitation of the insoluble gallium compound;
(B) washing the insoluble gallium compound with water to substantially remove halogen therefrom; and
(C) adding the substantially halogen-free insoluble gallium compound to an aqueous solution of lactic acid to form gallium lactate.

7. A process as defined by claim 6 wherein said organic material is 2,4-pentanedione.

8. A process as defined by claim 6 wherein said organic material is benzoic acid.

9. A process as defined by claim 6 wherein said organic material is terephthalic acid.

10. A process as defined by claim 6 wherein said organic material is 3-hydroxy-2-butanone.

11. A process for preparing gallium lactate, said process comprising:
- (A) forming a water-insoluble gallium compound by mixing (1) an aqueous solution of sodium gallate, (2) an organic material selected from the group consisting of carboxylic acids, diketones, and hydroxyketones, and (3) an aqueous acidic solution to adjust the pH of the mixture to obtain precipitation of the insoluble gallium compound;
- (B) washing the insoluble gallium compound with water to substantially remove halogen therefrom; and
- (C) adding the substantially halogen-free insoluble gallium compound to an aqueous solution of lactic acid to form gallium lactate.

12. A process as defined by claim 11 wherein said organic material is 2,4-pentanedione.

13. A process as defined by claim 11 wherein said organic material is benzoic acid.

14. A process as defined by claim 11 wherein said organic material is terephthalic acid.

15. A process as defined by claim 11 wherein said organic material is 3-hydroxy-2-butanone.

References Cited

UNITED STATES PATENTS 2,135,111   4/1936   Prebluda _____ 260—429

TOBIAS E. LEVOW, *Primary Examiner.*

A. P. DEMERS, *Assistant Examiner.*

U.S. Cl. X.R.

252—431; 260—863